United States Patent
No et al.

(10) Patent No.: US 9,619,005 B2
(45) Date of Patent: Apr. 11, 2017

(54) APPARATUS AND METHOD FOR SAVING POWER OF USB DEVICE

(75) Inventors: Ji-Hun No, Suwon-si (KR); Jeong-Hoon Park, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 633 days.

(21) Appl. No.: 13/876,117

(22) PCT Filed: Sep. 28, 2011

(86) PCT No.: PCT/KR2011/007122
§ 371 (c)(1),
(2), (4) Date: Apr. 16, 2013

(87) PCT Pub. No.: WO2012/044050
PCT Pub. Date: Apr. 5, 2012

(65) Prior Publication Data
US 2013/0198548 A1    Aug. 1, 2013

(30) Foreign Application Priority Data
Sep. 28, 2010    (KR) .................. 10-2010-0093539

(51) Int. Cl.
G06F 1/00    (2006.01)
G06F 1/32    (2006.01)

(52) U.S. Cl.
CPC ............ G06F 1/325 (2013.01); G06F 1/3253 (2013.01); Y02B 60/1235 (2013.01)

(58) Field of Classification Search
CPC .................................................. G06F 1/325
See application file for complete search history.

(56) References Cited

U.S. PATENT DOCUMENTS

| 7,103,788 B1* | 9/2006 | Souza et al. .................. 713/323 |
| 7,864,720 B2* | 1/2011 | Jeyaseelan .................... 370/311 |

(Continued)

FOREIGN PATENT DOCUMENTS

| KR | 1020080055602 A | 6/2008 |
| KR | 1020100070465 A | 6/2010 |
| KR | 1020100127347 A1 | 12/2010 |

OTHER PUBLICATIONS

Kris Fleming, 'Power Saving of Using USB Selective Suspend Support', Intel Mobile Platroms Group, pp. 1-7., May 20, 2003.

Primary Examiner — Mohammed Rehman
(74) Attorney, Agent, or Firm — Jefferson IP Law, LLP

(57) ABSTRACT

An apparatus and method for saving power of a USB composite network device is provided. The method includes sending an idle request IRP to a composite driver at a bus driver of a network driver when the composite network device requests selective suspend, sending power state transition information to the composite driver and shifting a power state from a normal state to an intermediate sleep state at the bus driver, and shifting a power state from the normal state to the intermediate sleep state at the composite driver according to the power state transition information, wherein, when the composite network device is shifted to the selective suspend mode, the bus driver and the composite driver are in the intermediate sleep state and an NDIS miniport driver of the network driver is in the normal state.

14 Claims, 4 Drawing Sheets

(56) References Cited

U.S. PATENT DOCUMENTS

| | | | |
|---|---|---|---|
| 2005/0246560 A1* | 11/2005 | Oshins | G06F 9/4411 |
| | | | 713/300 |
| 2006/0236351 A1* | 10/2006 | Ellerbrock | H04L 12/403 |
| | | | 725/81 |
| 2008/0072086 A1 | 3/2008 | Kim | |
| 2008/0098410 A1* | 4/2008 | Oshins | G06F 9/4411 |
| | | | 719/321 |
| 2009/0319660 A1* | 12/2009 | Cavalaris | G06F 13/385 |
| | | | 709/225 |
| 2010/0306788 A1* | 12/2010 | Lee et al. | 719/321 |
| 2011/0173351 A1* | 7/2011 | Aull | G06F 9/544 |
| | | | 710/8 |

* cited by examiner

APPARATUS AND METHOD FOR SAVING POWER OF USB DEVICE

TECHNICAL FIELD

The present invention relates to a composite network device. More particularly, the present invention relates to an apparatus and method for saving power of a Universal Serial Bus (USB) composite network device.

BACKGROUND ART

When a plurality of sub-devices are connected to ports connected to a host, the host uses a selective suspend mode to reduce power consumption. For example, when a USB network device connected to the host maintains an idle state during a certain time, the host operates only a port to which the USB network device is connected in a suspend state without influencing an operation of different ports connected to a USB root hub.

However, when the USB network device operates in a selective suspend mode, a USB network driver is in an intermediate sleep state D2, and does not receive a packet from a Transmission Control Protocol/Internet Protocol (TCP/IP) stack.

DISCLOSURE OF INVENTION

Solution to Problem

An aspect of the present invention is to solve at least the above-mentioned problems and/or disadvantages and to provide at least the advantages described below. Accordingly, an aspect of the present invention is to provide an apparatus and method for supporting a selective suspend function of a composite device.

Another aspect of the present invention is to provide an apparatus and method for supporting a selective suspend mode of a USB composite network device.

Another aspect of the present invention is to provide an apparatus and method for sending a packet to a USB composite network device which operates in a selective suspend mode.

Another aspect of the present invention is to provide an apparatus and method for classifying and operating a driver of a USB composite network device into a bus driver and an NDIS (Network Driver Interface Specification) miniport driver.

Another aspect of the present invention is to provide an apparatus and method for operating only a bus driver in an intermediate sleep state between the bus driver and an NDIS miniport driver which comprise a driver of a USB composite network device when the USB composite network device is in a selective suspend mode. performing a control operation to maintain an NDIS miniport driver in a normal state between a bus driver and the NDIS miniport driver which comprise a driver of a USB composite network device when the USB composite network device is in a selective suspend mode.

In accordance with an aspect of the present invention, a method of supporting a selective suspend mode of a composite network device equipped with at least two devices is provided. The method includes sending an idle request IRP to a composite driver at a bus driver of a network driver when the composite network device requests selective suspend, sending power state transition information to the composite driver and shifting a power state from a normal state to an intermediate sleep state at the bus driver, and shifting a power state from the normal state to the intermediate sleep state at the composite driver according to the power state transition information, wherein, when the composite network device is shifted to the selective suspend mode, the bus driver and the composite driver are in the intermediate sleep state and an NDIS miniport driver of the network driver is in the normal state.

In accordance with another aspect of the present invention, a host device for controlling a selective suspend mode of a composite network device equipped with at least two devices is provided. The host device includes a bus driver for sending an idle request IRP to a composite driver when the composite network device requests selective suspend, sending power state transition information to the composite driver, and shifting its own power state from a normal state to an intermediate sleep state and the composite driver for shifting its own power state from the normal state to the intermediate sleep state according to the power state transition information, wherein the bus driver and the composite driver are in the intermediate sleep state and the NDIS miniport driver of a network driver is in the normal state when the composite network device is shifted to the selective suspend mode, and wherein the network driver includes the NDIS miniport driver and the bus driver.

BRIEF DESCRIPTION OF DRAWINGS

The above and other aspects, features and advantages of certain exemplary embodiments of the present invention will be more apparent from the following detailed description taken in conjunction with the accompanying drawings, in which.

BEST MODE FOR CARRYING OUT THE INVENTION

Exemplary embodiments of the present invention will be described herein below with reference to the accompanying drawings. In the following description, well-known functions or constructions are not described in detail since they would obscure the invention in unnecessary detail. Also, the terms used herein are defined according to the functions of the present invention. Thus, the terms may vary depending on user's or operator's intension and usage. That is, the terms used herein must be understood based on the descriptions made herein.

Hereinafter, an apparatus and method for supporting a selective suspend mode of a composite device according to one embodiment of the present invention will be described. Herein, the selective suspend mode signifies a mode for operating only some devices in an idle mode between at least two devices included in a composite network device. That is, the selective suspend mode signifies a mode for operating only some devices in the idle mode to be different from a mode for operating all of the composite network device operate in the idle mode.

Assuming that a selective suspend mode of a USB device is supported, a description will now be given. Herein, the USB device includes a USB composite network device.

Figure 1:
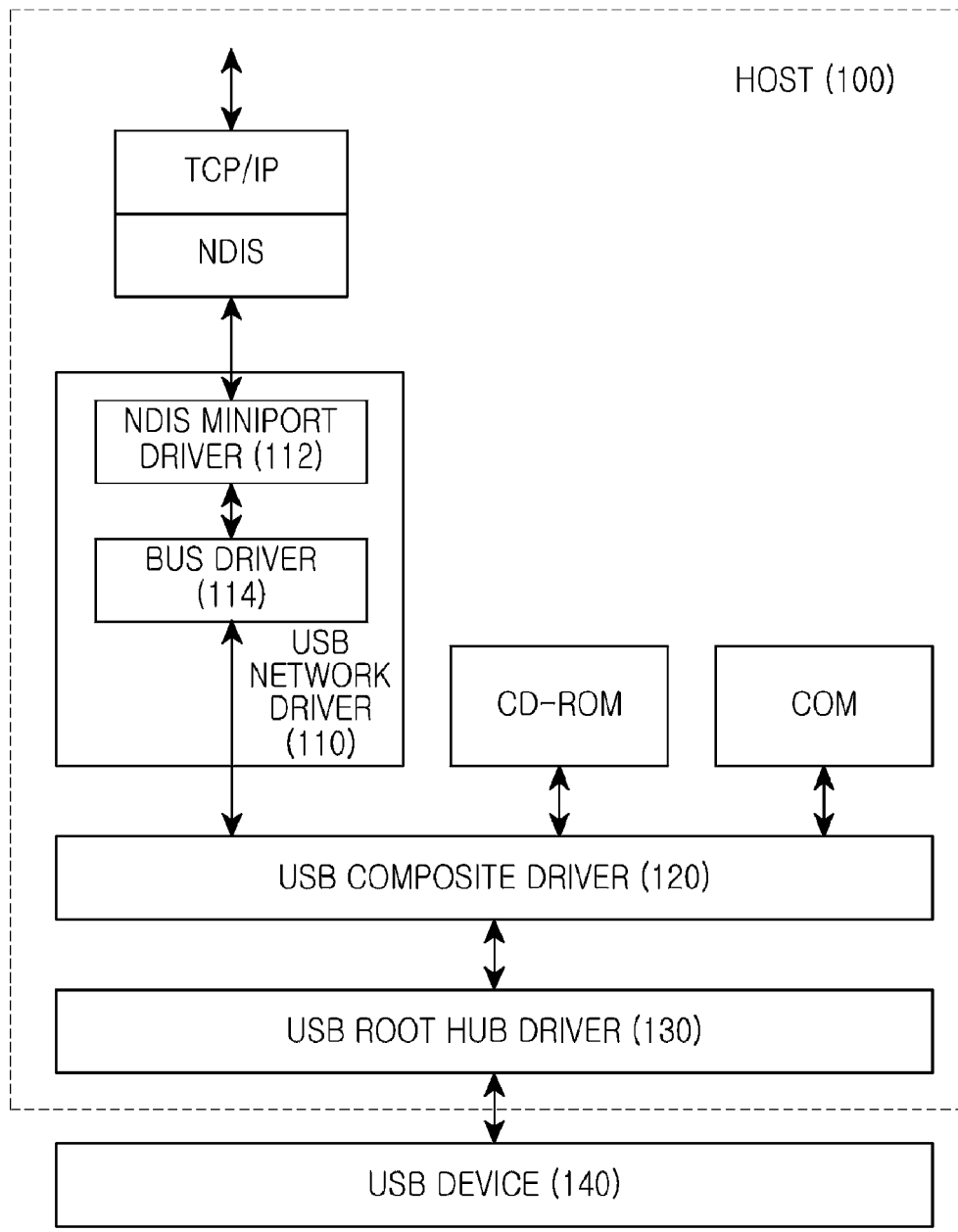
FIG. 1 is a block diagram of a host according to one embodiment of the present invention.

In order to support the selective suspend mode at the USB device, a host is composed as shown in FIG. 1 described later.

FIG. 1 is a block diagram of a host according to one embodiment of the present invention.

As shown in FIG. 1, the host denoted by 100 includes a TCP/IP, a Network Driver Interface Specification (NDIS), a USB network driver 110, a Compact Disc-Read Only Memory (CD-ROM), a COM, a USB composite driver 120, and a USB root hub driver 130.

The USB network driver 110 includes an NDIS miniport driver 112 and a bus driver 114.

The NDIS miniport driver 112 is a module for transmitting and receiving network data packets from a TCP/IP stack. For example, the NDIS miniport driver 112 queues packets when transmission of network data packets is not completed at the bus driver 114. On the other hand, the NDIS miniport driver 112 transmits packets to the bus driver 114 when the transmission of the network data packets is completed at the bus driver 114. Herein, the NDIS is a LAN card driver for a LAN manager and binds, and is a system for binding environments which uses different operating systems or different network cards as one. The NDIS enables a user to use a multi-protocol stack in a single host.

Also, when a power state request of a terminal is received from an Input/Output (I/O) manager, the NDIS miniport driver 112 transmits a power state of the terminal to the bus driver 114.

The bus driver 114 is a data module for transmitting and receiving network packets with a hardware interface. For example, the bus driver 114 queues packets when transmission of network packets is not completed in the USB network driver 110. On the other hand, the bus driver 114 transmits packets through the USB composite driver 120 when the transmission of the network packets is completed in the USB network driver 110.

The USB composite driver 120 includes a Function Drive Object (FDO) and a Physical Device Object (PDO) which are programs for controlling a USB device 140.

The USB root hub driver 130 is a module for controlling a path of packets such that the USB composite driver 120 and the USB device 140 transmit and receive packets.

The USB device 140 includes at least two devices including a USB network device. For example, the USB device 140 includes the USB network device and a CD-ROM for auto-installation of a driver of the USB network device. For another example, the USB device 140 may include at least two network devices.

Figure 2:
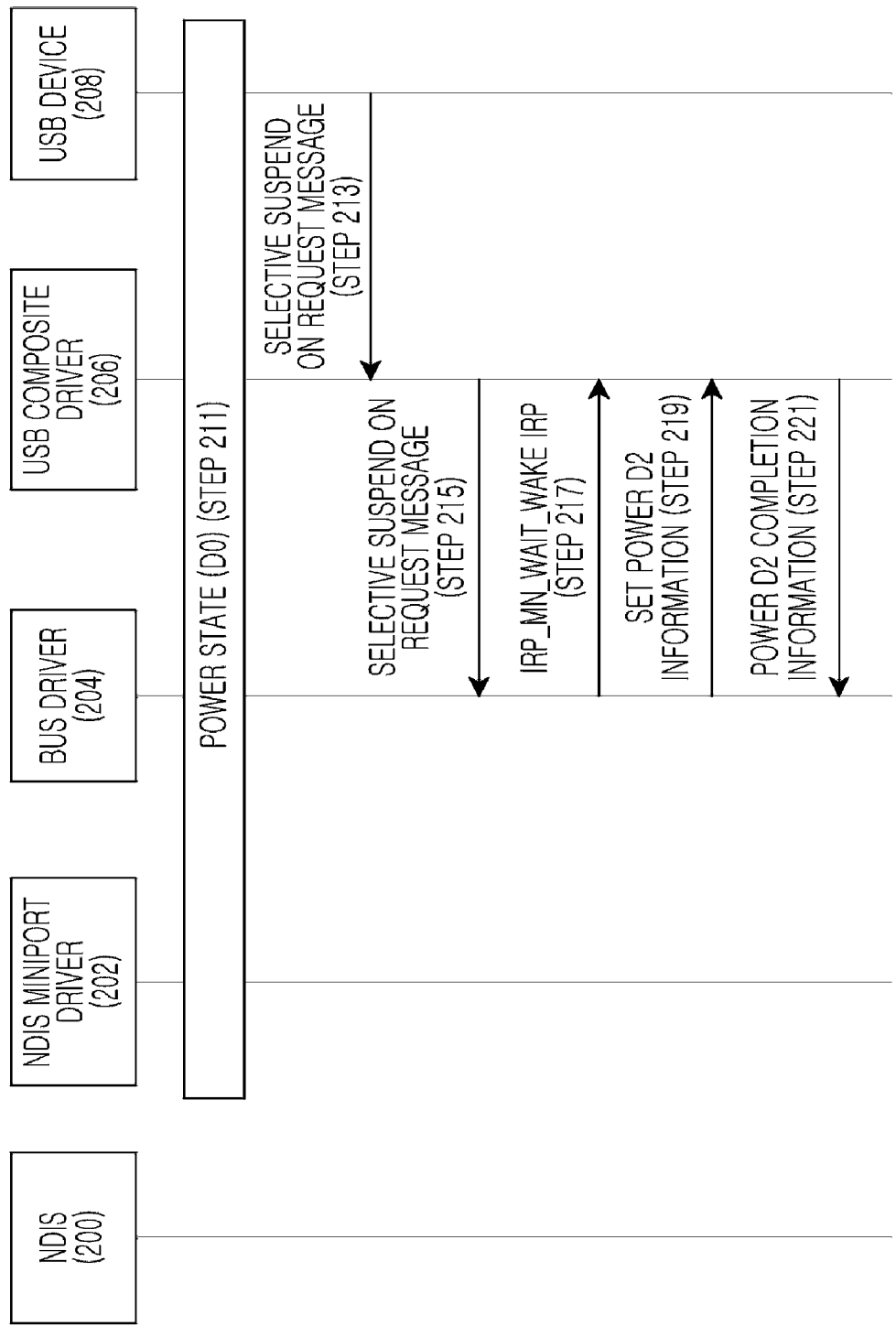
FIG. 2 illustrates a process of shifting a USB network device from an active mode to a selective suspend mode.

When a USB device supports a selective suspend mode, a USB network driver operates as shown in FIG. 2 described later.

FIG. 2 illustrates a process of shifting a USB network device from an active mode to a selective suspend mode according to one embodiment of the present invention.

As shown in FIG. 2, when a USB device 208 operates in a normal mode, an NDIS miniport driver 202, a bus driver 204, and a USB composite driver 206 are in a normal state D0 (step 211).

When a suspend ON event occurs at the USB device 208, the USB device 208 sends a selective suspend ON request message to the bus driver 204 through the USB composite driver 206 (steps 213 and 215).

The bus driver 204 sends an idle request I/O Request Packet (IRP) and a wait wake callback to the USB composite driver 206 according to the suspend ON request of the USB device 208 (step 217). For example, the bus driver 204 sends an IRP_MN_wait_wake IRP which includes the idle request IRP and the wait wake callback to the USB composite driver 206. For another example, the bus driver 204 sends the idle request IRP to the USB composite driver 206. When a response signal for the idle request IRP is received, the bus driver 204 may sends the wait wake callback to the USB composite driver 206. Herein, the idle request IRP includes an idle request completion routine.

The bus driver 204 sends power state transition information, that is, set power D2 information to the USB composite driver 206 (step 219). At this time, the bus driver 204 changes its own power state from a normal state D0 to an intermediate sleep state D2.

The USB composite driver 206 changes its own power state from the normal state D0 to the intermediate sleep state D2 according to the set power D2 information. The USB composite driver 206 sends power D2 completion information to the bus driver 204 (step 221). Although it is not shown in FIG. 2, the USB composite driver 206 may send the set power D2 information to the USB device 208. In this case, the USB device 208 shifts a network device from the active mode to a suspend mode according to the set power D2 information.

As described above, when the USB device 208 is changed to the selective suspend mode, the bus driver 204 and the USB composite driver 206 are in the intermediate sleep state D2. However, the NDIS miniport driver 202 maintains the normal state D0.

Hereinafter, a method of activating a USB device which is in a selective suspend mode will be described. A method of shifting the USB device from the selective suspend mode to an active mode according to a request of a host will be described with reference to FIG. 3.

Figure 3:
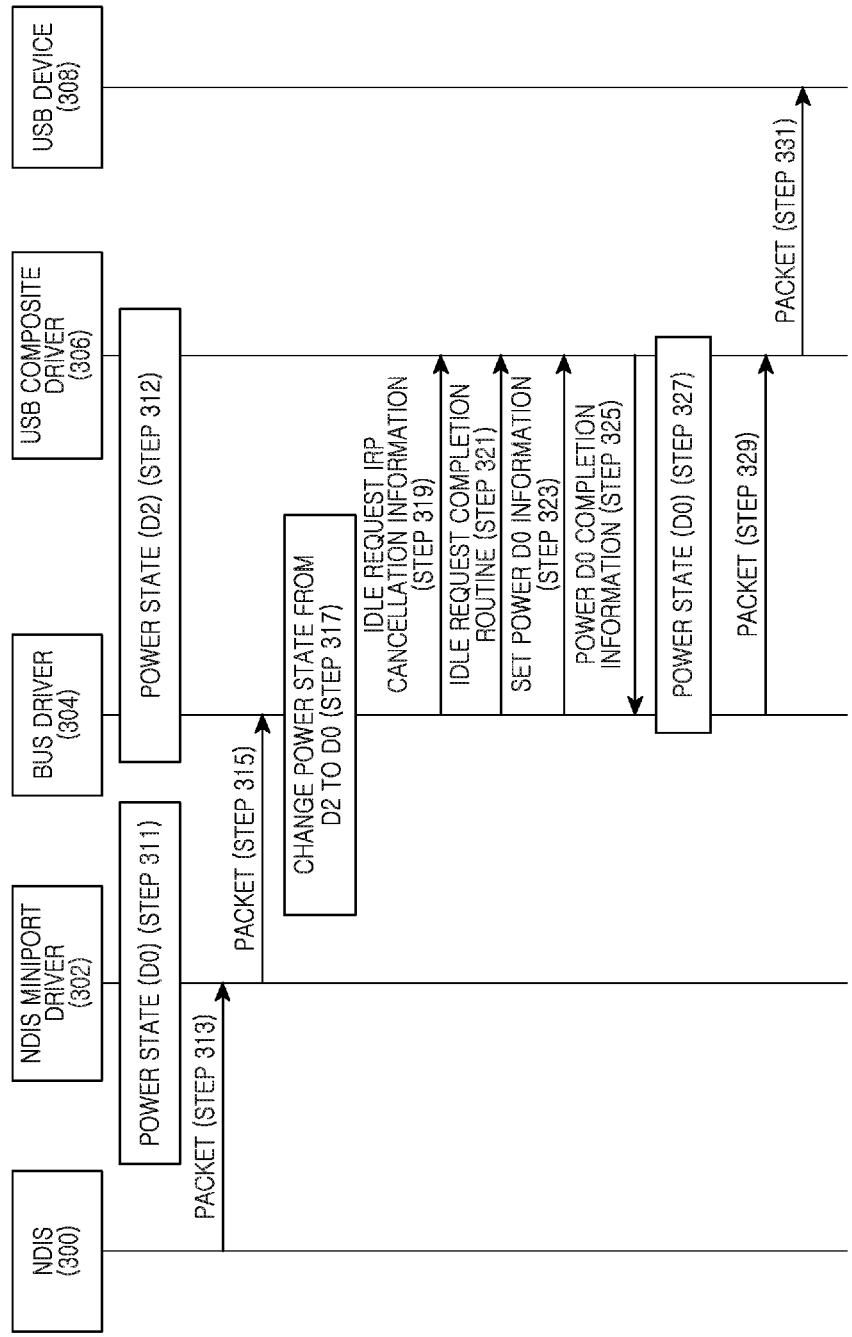
FIG. 3 illustrates a process of shifting a USB network device from a selective suspend mode to an active mode according to one embodiment of the present invention.

FIG. 3 illustrates a process of shifting a USB device from a selective suspend mode to an active mode according to one embodiment of the present invention.

As shown in FIG. 3, when a USB device 308 operates in a selective suspend mode, an NDIS miniport driver 302 is in a normal state D0 (step 311). A bus driver 304 and a USB composite driver 306 are in an intermediate sleep state D2 (step 312).

When a packet to be sent from a host to the USB device 308 is generated, an NDIS 300 sends the packet to the NDIS miniport driver 302 (step 313). When the packet is received, the NDIS miniport driver 302 sends the packet to the bus driver 304 using a write IRP (step 315). At this time, because the NDIS miniport driver 302 is in the normal state D0 although the USB device 308 operates in the selective suspend mode, it may receive the packet from an upper node.

When the packet is received from the NDIS miniport driver 302, the bus driver 304 changes its own power state from the intermediate sleep state D2 to the normal state D0 (step 317).

The bus driver 304 sends cancellation information for an idle request IRP to the USB composite driver 306 (step 319). That is, the bus driver 304 cancels the idle request IRP transmitted to the USB composite driver 206 shown in FIG. 2.

If the cancellation of the idle request IRP is completed, the USB composite driver 306 calls an idle request completion routine (step 321). That is, the USB composite driver 306 performs an idle request completion procedure with the bus driver 304.

If the idle request completion routine is called, the bus driver 304 sends power state transition information, that is, set power D0 information to the USB composite driver 306 (step 323).

The USB composite driver 306 changes its own power state from the intermediate sleep state D2 to the normal state D0. The USB composite driver 306 sends power D0 completion information to the bus driver (step 325). Although it is not shown in FIG. 3, the USB composite driver 306 may send the set power D0 information to the USB device 308. In this case, the USB device 308 shifts a network device from a suspend mode to an active mode according to the set power D0 information.

When the power D0 completion information is received, the bus driver 304 recognizes the power state of the USB composite driver 306 as the normal state D0 (step 327). Therefore, the bus driver 304 sends the packet provided from the NDIS miniport driver 302 to the USB device 308 through the USB composite driver 306 (steps 329 and 331).

Hereinafter, assuming that a USB device itself requests transition from a selective suspend mode to an active mode, a description will now be given.

Figure 4:
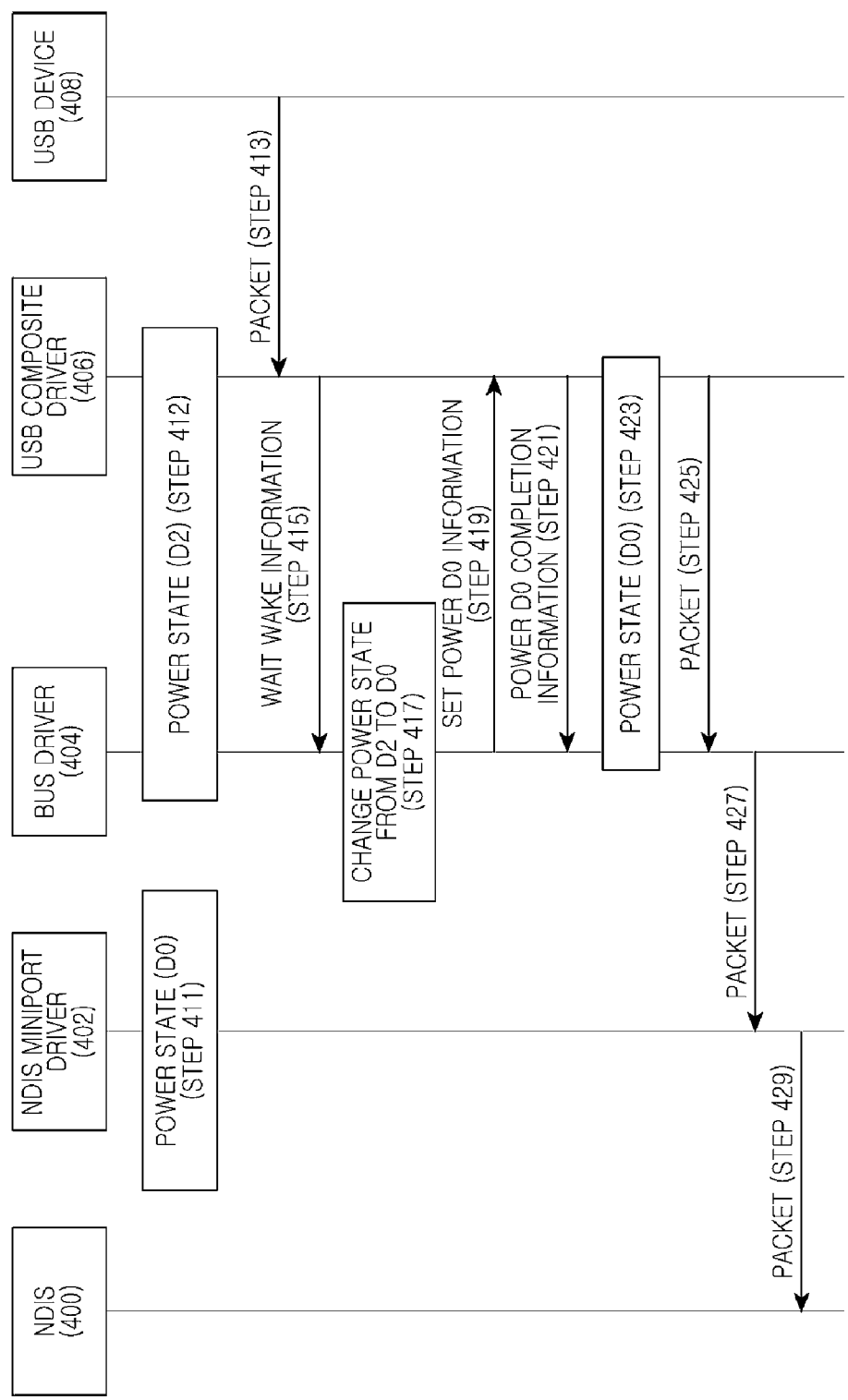
FIG. 4 illustrates a process of shifting a USB network device from a selective suspend mode to an active mode according to another embodiment of the present invention.

FIG. 4 illustrates a process of shifting a USB device from a selective suspend mode to an active mode according to another embodiment of the present invention.

As shown in FIG. 4, when a USB device 408 operates in a selective suspend mode, an NDIS miniport driver 402 is in a normal state D0 (step 411). A bus driver 404 and a USB composite driver 406 are in an intermediate sleep state D2 and (step 412).

The USB device 408 verifies whether a wait wake event occurs. For example, the USB device 408 verifies whether a packet to be sent to an upper node is generated.

Assuming that the packet to be sent to the upper node is generated, the USB device 408 sends the packet to the USB composite driver 406 (step 413).

The USB composite driver 406 calls a wait wake call back (step 415). That is, the USB composite driver 406 sends operation mode change information, that is, wait wake information to the bus driver 404 through the wait wake callback.

If the wait wake callback is called, the bus driver 404 changes its own power state from the intermediate sleep state D2 to the normal state D0 (step 417).

The bus driver 404 sends power state transition information, that is, set power D0 information to the USB composite driver 406 (step 419).

The USB composite driver 406 changes its own power state from the intermediate sleep state D2 to the normal state D0 according to the set power D0 information. The USB composite driver 406 sends power D0 completion information to the bus driver 404 (step 421).

The USB composite driver 406 recognizes the power state of the bus driver 404 as the normal state D0 (step 423). Therefore, the USB composite driver 406 sends the packet provided from the USB device 408 to an NDIS 400 through the bus driver 404 and the NDIS miniport driver 402 (steps 425, 427, and 429). That is, the USB composite driver 406 sends the packet to a TCP/IP stack.

As described above, the present invention maintains the NDIS miniport driver in the normal state although the USB composite network device operates in the selective suspend mode by classifying and operating the bus driver and the NDIS miniport driver which comprise a driver of the USB composite network device, thereby also receiving the packet from the upper node in the selective suspend mode and reducing power consumption.

While the present invention has been particularly shown and described with reference to exemplary embodiments thereof, it will be understood by those skilled in the art that various changes in form and details may be made therein without departing from the spirit and scope of the present invention as defined by the appended claims.

The invention claimed is:

1. A method of supporting a selective suspend mode of a composite network device, the method comprising:
   sending, by a bus driver included in a network driver of a host device, an idle request IRP to a composite driver of the host device when the composite network device requests selective suspend;
   sending, by the bus driver, power state transition information to the composite driver and shifting a power state of the bus driver of the host device from a normal state to an intermediate sleep state; and
   shifting, by the composite driver of the host device, a power state from the normal state to the intermediate sleep state according to the power state transition information,
   wherein the composite driver includes a functional drive object (FDO) and a physical device object (PDO), and
   wherein, when the composite network device is shifted to the selective suspend mode, the bus driver and the FDO and the PDO of the composite driver are in the intermediate sleep state and an NDIS miniport driver included in the network driver of the host device is in the normal state.

2. The method of claim 1, wherein the sending of the idle request IRP to the composite driver comprises sending an IRP_MN_wait_wake IRP including the idle request IRP and a wait wake callback to the composite driver.

3. The method of claim 1, wherein the idle request IRP includes an idle request completion routine.

4. The method of claim 1, further comprising:
   sending, by the NDIS miniport driver, a packet to the bus driver when the NDIS miniport driver receives the packet from a host after shifting the power states of the bus driver and the composite driver from the normal state to the intermediate sleep state;
   shifting, by the bus driver, the power state from the intermediate sleep state to the normal state when the packet is received;
   sending, by the bus driver, the power state transition information to the composite driver; and
   shifting, by the composite driver, the power state from the intermediate sleep state to the normal state according to the power state transition information.

5. The method of claim 4, further comprising:
   sending, by the bus driver, the packet to the composite driver after shifting the states of the bus driver and the composite driver from the intermediate sleep state to the normal state; and
   sending, by the composite driver, the packet to the composite network device.

6. The method of claim 1, further comprising:
   sending, by the composite network device, a packet to the composite driver when the packet to be sent from the composite network device to an upper node is generated after shifting the power states of the bus driver and the composite driver from the normal state to the intermediate sleep state;
   sending, by the composite driver, operation mode change information of the composite network device to the bus driver when the packet is received;

shifting, by the bus driver, the power state from the intermediate sleep state to the normal state when the operation mode change information is received;

sending, by the bus driver, power state transition information to the composite driver; and shifting, by the composite driver, the power state from the intermediate sleep state to the normal state according to the power state transition information.

7. The method of claim 6, further comprising:

sending, by the composite driver, the packet to the bus driver after shifting the power states of the bus driver and the composite driver from the intermediate sleep state to the normal state; and sending, by the bus driver, the packet to the NDIS miniport driver.

8. A host device for controlling a selective suspend mode of a composite network device, the host device comprising:

a composite driver that includes a functional drive object (FDO) and a physical device object (PDO); and a bus driver included in a network driver configured to:
send an idle request IRP to the composite driver when the composite network device requests selective suspend, send power state transition information to the composite driver, and shift its own power state from a normal state to an intermediate sleep state, wherein the composite driver is configured to shift the composite driver's own power state from the normal state to the intermediate sleep state according to the power state transition information, wherein the bus driver and the FDO and the PDO of the composite driver are in the intermediate sleep state and an NDIS miniport driver included in the network driver is in the normal state when the composite network device is shifted to the selective suspend mode, and wherein the network driver includes the NDIS miniport driver and the bus driver.

9. The host device of claim 8, wherein the bus driver is further configured to send an IRP_MN_wait_wake IRP including the idle request IRP and a wait wake callback to the composite driver.

10. The host device of claim 8, wherein the idle request IRP includes an idle request completion routine.

11. The host device of claim 8, wherein the NDIS miniport driver is further configured to send a packet to the bus driver when the NDIS miniport driver receives the packet from a host after shifting the power states of the bus driver and the composite driver from the normal state to the intermediate sleep state, wherein the bus driver is further configured to shift the bus driver's own power state from the intermediate sleep state to the normal state when the bus driver receives the packet and sends the power state transition information to the composite driver, and wherein the composite driver is further configured to shift the composite driver's own power state from the intermediate sleep state to the normal state according to the power state transition information.

12. The host device of claim 11, wherein the bus driver is further configured to send the packet to the composite driver after shifting the states of the bus driver and the composite driver from the intermediate sleep state to the normal state, and wherein the composite driver is further configured to send the packet to the composite network device.

13. The host device of claim 8, wherein the composite driver is further configured to send operation mode change information of the composite network device to the bus driver when a packet is received from the composite network device after shifting the power state from the normal state to the intermediate sleep state, wherein the bus driver is further configured to:
shift the bus driver's own power state from the intermediate sleep state to the normal state when the operation mode change information is received, and send power state transition information to the composite driver, and wherein the composite driver shifts the composite driver's own power state from the intermediate sleep state to the normal state according to the power state transition information.

14. The host device of claim 13, wherein the composite driver is further configured to send the packet to the bus driver after shifting the power states of the bus driver and the composite driver from the intermediate sleep state to the normal state, and wherein the bus driver is further configured to send the packet to the NDIS miniport driver.

* * * * *